(12) United States Patent
Basu et al.

(10) Patent No.: US 7,260,064 B2
(45) Date of Patent: Aug. 21, 2007

(54) METHOD AND APPARATUS FOR PERFORMING NETWORK ROUTING BASED ON QUEUE LENGTHS

(75) Inventors: Anindya Basu, Jersey City, NJ (US); Alvin Lai Lin, Vienna, VA (US); Sharad Ramanathan, Springfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1041 days.

(21) Appl. No.: 10/269,671

(22) Filed: Oct. 11, 2002

(65) Prior Publication Data

US 2004/0071082 A1  Apr. 15, 2004

(51) Int. Cl.
*H04L 12/28* (2006.01)
*G06F 15/173* (2006.01)

(52) U.S. Cl. ............. 370/238; 370/400; 709/242

(58) Field of Classification Search ............ 370/229, 370/237, 238, 400, 401; 709/239–242
See application file for complete search history.

(56) References Cited

U.S. PATENT DOCUMENTS

| | | | |
|---|---|---|---|
| 5,029,075 A * | 7/1991 | Hirasawa ............... | 709/241 |
| 5,291,550 A | 3/1994 | Levy et al. ............. | 379/242 |
| 5,317,562 A | 5/1994 | Nardin et al. .......... | 370/16 |
| 5,402,416 A | 3/1995 | Cieslak et al. ......... | 370/60 |
| 5,426,640 A * | 6/1995 | Hluchyj et al. ........ | 370/235 |
| 5,583,792 A | 12/1996 | Li et al. ................ | 364/516 |
| 5,596,719 A | 1/1997 | Ramakrishnan et al. ............... | 395/200.02 |
| 5,600,638 A * | 2/1997 | Bertin et al. ........... | 370/351 |
| 5,995,503 A * | 11/1999 | Crawley et al. ........ | 370/351 |
| 6,092,096 A | 7/2000 | Lewis ................... | 709/200 |
| 6,201,810 B1 * | 3/2001 | Masuda et al. ........ | 370/395.32 |
| 6,647,412 B1 * | 11/2003 | Strandberg et al. .... | 709/223 |
| 6,765,872 B1 * | 7/2004 | Tazaki .................. | 370/235 |
| 6,785,260 B1 * | 8/2004 | Goyal et al. ........... | 370/351 |
| 6,914,877 B1 * | 7/2005 | Alamineh .............. | 370/217 |
| 2002/0167901 A1 * | 11/2002 | Brown et al. .......... | 370/229 |
| 2003/0128687 A1 * | 7/2003 | Worfolk et al. ........ | 370/351 |
| 2003/0206527 A1 * | 11/2003 | Yim ..................... | 370/238 |
| 2004/0001442 A1 * | 1/2004 | Rayment et al. ....... | 370/238 |

OTHER PUBLICATIONS

U.S. Appl. No. 09/266,622, filed Mar. 11, 1999, Aukia et al.
U.S. Appl. No. 09/514,725, filed Feb. 28, 2000, Goel et al.
U.S. Appl. No. 09/441,693, filed Nov. 16, 1999, Bouillet et al.
U.S. Appl. No. 09/537,791, filed Mar. 29, 2000, Liu et al.

* cited by examiner

*Primary Examiner*—Chau Nguyen
*Assistant Examiner*—Hong Sol Cho
(74) *Attorney, Agent, or Firm*—Kenneth M. Brown

(57) ABSTRACT

A method and apparatus for network routing in packet-based networks which advantageously takes traffic conditions into account dynamically in determining the "best route" for routing a packet to its intended destination. Illustratively, a potential function is employed whereby hypothetical electrostatic potential values are calculated at each node or link of a network, and the packets are routed in accordance with these potential function values (e.g., in the direction of the lowest neighboring value). The potential function values may be advantageously calculated based on queue lengths at the various nodes (or links) in combination with a minimum-cost distance calculated to the packet's intended destination.

18 Claims, 3 Drawing Sheets

METHOD AND APPARATUS FOR PERFORMING NETWORK ROUTING BASED ON QUEUE LENGTHS

FIELD OF THE INVENTION

The present invention relates generally to the field of packet-based data networks and more particularly to a method and apparatus for performing network routing based at least in part on the lengths of packet queues within the network.

BACKGROUND OF THE INVENTION

In the operation of packet-based networked systems such as, for example, the Internet, the expeditious routing of data packets is of very high importance. Typically, the minimum-cost path (i.e., the path having the minimum sum of costs associated with the links along the path) between a packet's source node and its destination node are chosen as the best candidates for routing packets through the network, since, in general, the use of such paths are most likely to be the most efficient means of transmitting the packets. (Such a minimum-cost path is sometimes referred to as a "shortest" path, although this nomenclature is literally equivalent only where the number of links or "hops" is the cost metric.) Numerous methods and algorithms exist in the prior art to determine those network data links that comprise the minimum-cost path between a source node and a destination node.

The Dijkstra method, fully familiar to those of ordinary skill in the art and as described, for example, in E. W. Dijkstra, "A Note on Two Problems in Connexion with Graphs," Numberische Mathematic 1, pp. 269-271 (1959), is probably the best known of these methods of determining a minimum-cost path through a graph (e.g., a network). Specifically, the Dijkstra method determines the minimum-cost path from a source node to a destination node by accumulating network link distances, or lengths, for each path from the source node to the destination node. Note that, in general, these methods allow arbitrary but fixed "cost" measures to be assigned to each link in the network. (That is, in general, the total "length" of a path from a source node to a destination node is equal to an accumulation of these "costs" along the path, rather than merely a count of the number of links along the paths.)

Dijkstra and other such prior art methodologies, even when using assignable cost measures, determine the best path solely on the basis of link cost metrics—that is, they do not consider dynamic effects such as traffic conditions, which may affect data transmission throughput or packet delay. However, when such traffic conditions are taken into account, the calculated minimum-cost path may be neither the most efficient path nor the most expeditious route for sending data between a given source node and a corresponding destination node. For example, it may be the case that the minimum-cost path includes one or more highly used network nodes and/or links, thereby creating a tendency for those nodes and links to become heavily congested with packet traffic. In addition, data paths using older transmission media may be less efficient than a longer data path using newer transmission media. (The older transmission media may introduce significant time delays in the data transmission that cause congestion to occur and thereby adversely affect the timely reception of the data.)

In co-pending U.S. patent application Ser. No. 09/537, 791, "Method for Finding Shortest Network Paths Subject to System Constraints," filed by G. Liu and K. G. Ramakrishnan on Mar. 29, 2000 and assigned to the assignee of the present invention, a method is disclosed for determining the minimum-cost paths between a source node and a destination node in a network wherein the paths satisfy certain imposed system constraints, such as, for example, link or node delay. In particular, candidate paths are evaluated by accumulating system parameter information from a source node and projecting the system parameter information ahead to the destination node in an iterative fashion. Then, when the accumulated and projected system parameter information for the candidate path satisfies the imposed system constraints, the candidate path is saved for further evaluation, whereas candidate paths that fail to satisfy the imposed system constraints are removed from further processing. Thus, a route which comprises a "shortest path" (i.e., a minimum-cost path) but which nonetheless satisfies the imposed system constraints may be advantageously determined. Co-pending U.S. patent application Ser. No. 09/537, 791 is hereby incorporated by reference as if fully set forth herein.

Although the use of the technique of U.S. patent application Ser. No. 09/537,791 ensures that a selected route through a network will not violate a given (predefined) set of system constraints, there is no assurance that other, non-selected routes are not in fact more efficient than the selected one, when dynamic issues such as traffic conditions are taken into account. Thus, it would be highly desirable if a method for route selection were available in which a "most efficient" route, measured in terms of both minimum-cost distance and network traffic conditions, could be identified. Moreover, it would be highly desirable if such a route could be determined without requiring the use of a time-consuming iterative procedure.

SUMMARY OF THE INVENTION

To overcome the limitations of the prior art, a network routing method and apparatus is provided which advantageously takes traffic conditions into account dynamically in determining the "best route" for routing a packet to its intended destination. Specifically, in accordance with one illustrative embodiment of the present invention, a "potential" function is employed whereby (e.g., hypothetical electrostatic) potential values are calculated at each node or link of a network, and the packets are routed in accordance with these potential function values (e.g., in the direction of the lowest neighboring potential value).

Illustratively, the potential function values are advantageously calculated dynamically based on traffic conditions, as measured, for example, by packet queue lengths at the various nodes (or links), in combination with a minimum-cost distance calculated to the packet's intended destination. In this manner, the instant routing algorithm will advantageously route packets away from heavily loaded routers and network links (e.g., those with long packet queues) and towards less heavily loaded routers and links, while nonetheless ensuring that each packet progresses expeditiously to its destination. In other words, the use of the instant routing algorithm in accordance with an illustrative embodiment of the present invention ensures the selection of a "most efficient" route for the packet to its intended destination.

More specifically, and in accordance with one illustrative embodiment of the present invention, a method and apparatus for routing data packets in a network is provided, wherein the method or apparatus comprises steps of or means for, respectively, receiving a data packet at a first node of the network; determining a plurality of potential function values for a corresponding plurality of neighboring network nodes to said first node, each of said potential function values having been calculated based at least on one or more measures of traffic conditions associated with said corresponding neighboring node; and routing said data packet based on said plurality of potential function values. Illustratively, the one or more measures of traffic conditions associated with the neighboring nodes comprise packet queue lengths associated therewith.

DETAILED DESCRIPTION

Figure 1:
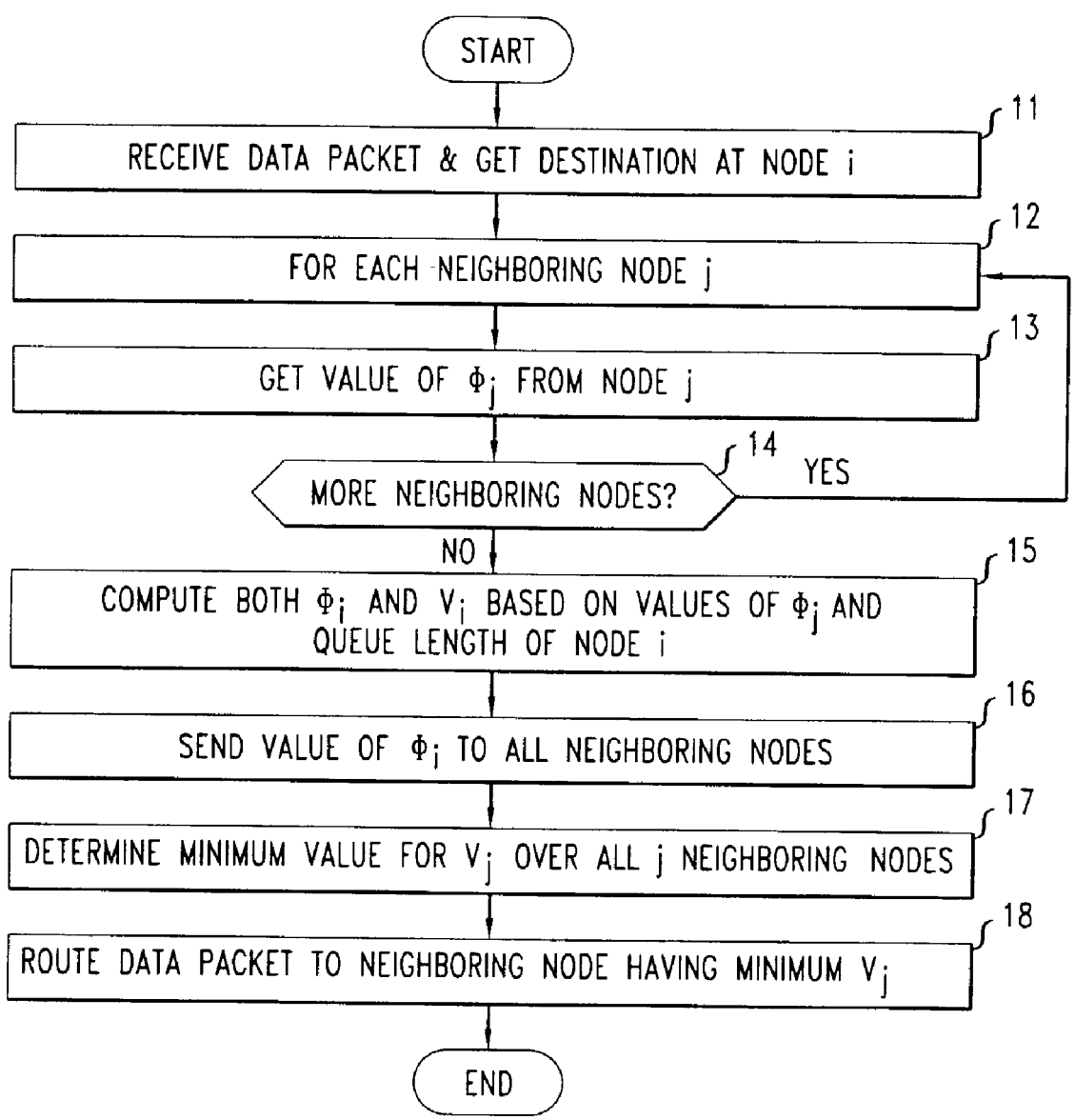
FIG. 1 shows a flowchart of an illustrative routing method in accordance with one illustrative embodiment of the present invention.

Packet Routing According to Illustrative Embodiments of the Present Invention

For ease of understanding, the illustrative embodiments of the present invention as described below have assumed that packet queues are specifically associated with individual network nodes (i.e., routers). In many packet-based networks, however, these queues are in fact associated with network links instead. However, it is well known to those of ordinary skill in the art that for any graph (such as, for example, a graph representative of a packet network), a "transformed" graph may be easily constructed in which each network (i.e., graph) link is replaced by a network node (and each network node is replaced by one or more network links). Thus, it will be obvious to those skilled in the art that for any network having packet queues associated with links (rather than nodes), an equivalent network (i.e., a "transformed" network graph) may be easily generated which has its packet queues associated with the network nodes instead. Then, as will also be obvious to those skilled in the art, the illustrative embodiments of the present invention described herein may then be directly applied to these "transformed" network graphs.

In accordance with one illustrative embodiment of the present invention, the following total potential function, V, is advantageously defined and calculated for each network node (e.g., each router) with respect to a given packet destination as follows:

$$V = v_d + \alpha \Phi, \quad (1)$$

where $v_d$ is a function of the distance from the given network node to the given packet destination; where $\alpha$ is a definable parameter (see below); and where $\Phi$ is a traffic potential function based on one or more queue lengths associated with the given network node, and further based on one or more traffic potential function values associated with neighboring network nodes to the given network node. (A neighboring network node or router to a given network node or router as used herein is hereby defined to be a network node or router which is directly connected to the given network node or router by a single network link. In other words, a neighboring network node or router is a node or router which is immediately adjacent to the given node or router. Note that this is also sometimes referred to as a "nearest neighbor.")

Note that the use of this potential function V as defined herein will advantageously cause packets to be routed to their destination based concurrently on two independent factors—both the (minimum-cost) distance to the destination (as in prior art routing algorithms), and the traffic potential function values associated with each of the neighboring nodes (i.e., the adjacent routers). We will refer herein to the former factor as the "distance-based factor" and to the latter factor as the "traffic-based factor."

Specifically, then, the parameter $\alpha$ may be advantageously set to any non-zero value, and may be adjusted in order to alter the degree to which each of these factors contributes to packet routing. Specifically, in accordance with certain illustrative embodiments of the present invention, $\alpha$ may be advantageously set to a value in the range from 0.3 to 0.7, such as, for example, to 0.5.

The function $v_d$ may be advantageously chosen to be any monotonically increasing function of the minimum-cost distance (d) of the packet from the current location (i.e., the given network node for which the potential function V is being calculated) to its (intended) destination. As in prior art routing algorithms, the minimum-cost distance may be defined as simply a "hop" count (i.e., the smallest possible number of links from the current location to the destination), or it may, in general, be advantageously defined as a minimum sum of the "costs" along all possible routes from the current location to the destination—where the "costs" may be predefined metric values, typically assigned to the links of the network graph and representative of an effective "distance" between points (typically, nodes) within the graph.

In accordance with one illustrative embodiment of the present invention, the function $v_d$ may be defined as the identity function (i.e., $v_d = d$), where d is the total cost of the minimum-cost path. However, in accordance with another, preferred embodiment of the present invention, the function $v_d$ is advantageously chosen to be defined instead as follows:

$$v_d = d - 1/d. \quad (2)$$

It will be obvious to those skilled in the art that this particular choice of the function $v_d$ will advantageously ensure that the routing of packets which are relatively near to their intended destination will have a higher priority given to the "distance-based" factor relative to the "traffic-based" factor (as each term is defined above), as compared with the routing of packets that are still some distance from their destination.

The traffic potential function, $\Phi$, is advantageously determined based on routing traffic conditions—illustratively, it is based directly on the packet queue lengths at each neighboring network node to the given network node, as well as (indirectly) on the packet queue lengths at other nearby network nodes. Specifically, in accordance with an illustrative embodiment of the present invention, the traffic potential value at a given network node is advantageously set to the maximum of:

(i) the packet queue length at the given node (recalling that for simplicity of description we are assuming herein that packet queues are associated with network nodes rather than with network links—see discussion above); and (ii) a function of the traffic potential values at the neighboring nodes to the given node.

Mathematically, the traffic potential value at a given network node i may be illustratively given by the following equation:

$$\Phi_i = \max\left\{q_i, (1/z_{\max}) \sum_{j=nn_1}^{nn_z} \Phi_j\right\}, \quad (3)$$

where the summation $$\left(\sum_{j=nn_1}^{nn_z} \Phi_j\right)$$

is performed over all neighboring network nodes to network node i (i.e., "$nn_1$" to "$nn_z$"); z is the number of such neighboring network nodes to network node i; $z_{max}$ is the maximum degree of the graph (i.e., the maximum number of neighboring nodes to any network node; and where $q_i$ is the length of the packet queue at network node i. Note that by setting each node's traffic potential value to be the maximum of its own packet queue length and a function of the traffic potential values of its neighboring nodes, the packet queue lengths of the neighboring nodes, as well as the packet queue lengths of neighboring nodes to the neighboring nodes, etc., all indirectly influence each node's traffic potential value.

In accordance with one illustrative embodiment of the present invention, a centralized network architecture may be employed in which a centrally located processor receives data from each node (or link) relating to packet queue lengths, and then calculates either the traffic potential values $\Phi_i$ and/or the total potential function values $V_i$ for each node i in the network (and, in the case of the total potential functions, each possible packet destination), based thereupon. Then, the centrally located processor may either determine the specific packet routing information, or, alternatively, may communicate the calculated potential values to the individual nodes (e.g., routers) for individual packet route determination.

In accordance with another, preferred embodiment of the present invention, however, a distributed network architecture is employed in which each node (e.g., router) locally calculates its associated potential values, communicating its own packet queue length and/or potential values to its neighboring nodes, and similarly, receiving such information about its neighboring nodes therefrom. Then, each node is advantageously able to make its own packet routing determinations in a completely local and self-contained manner.

Also, in accordance with one illustrative embodiment of the present invention, the potential function values as described herein may be updated in a periodic manner, such as, at a fixed rate. For example, the values of $\Phi_i$ and $V_i$ may be automatically recalculated periodically—say, every 0.1 seconds. In accordance with another, preferred embodiment of the present invention, however, a trigger-based mechanism may be advantageously employed, wherein each node sends updated packet queue length information to its neighboring nodes only when its queue length has changed—preferably, only when it has changed by at least a certain, significant amount, such as, for example, by 10%. Then, only when a network node receives such updated queue length information from one (or more) of its neighboring nodes does it recalculate the value(s) of its potential function(s).

Given that the values of the function V have been calculated for each network node, then, in accordance with an illustrative embodiment of the present invention, a packet received at a given node and having a given destination is advantageously routed to the neighboring node to the given node which has the smallest value of the function V (with respect to that particular packet's intended destination). (Note that equivalently, the packet may be said to be routed to the neighboring node having the greatest difference in values of the function V from the given node—since the given node's value of the function V is fixed at any particular point in time with respect to the packet's intended destination.) Mathematically, then, when a packet is received at node i, it is advantageously routed to a node k, where node k is a neighboring node to node i, for which:

$$V_i - V_k = \max_{j=nn_1}^{nn_z}\{(V_i - V_j)\}, \quad (4)$$

or, equivalently, for which:

$$V_k = \min_{j=nn_1}^{nn_z}\{V_j\}. \quad (5)$$

In accordance with one illustrative embodiment of the present invention, each network node is a router which maintains and dynamically updates an applicable routing table or other routing database (such as, for example, a routing tree or, as it is commonly called, a routing "trie"). Routing tables and routing tries provide the means for a router to quickly determine the neighboring node (e.g., the router) to which an incoming packet should be directly sent, based on its intended destination. (Routing tables and routing tries are conventional and fully familiar to those of ordinary skill in the art.) Then, in accordance with this trigger-based illustrative embodiment (see discussion above), each network router advantageously maintains (i.e., updates) its routing table (or routing trie) based on information updates received from its neighboring nodes. That is, whenever it receives such updated information from one or more of its neighboring nodes, it correspondingly updates its routing database in accordance with these new potential function values.

Illustratively, note that the value of the total potential function V at a given network node (and with respect to a given packet destination) may be thought of as a hypothetical electrostatic potential which can be imagined to be physically present on the given node. Then, the flow of a packet to be routed may be similarly imagined to be representative of a current flowing through the network based on the electrostatic potential values at the various nodes. That is, the illustrative routing method of the present invention can be analogized to a physical system in which current (i.e., the packet) naturally flows from its source to its destination via the electrostatically most efficient route through the network, because it always takes a path in the direction of local maximum electrostatic "force"—that is, based on where the electrostatic potential difference between the current node and the chosen neighboring node is greatest (as compared to the other neighboring nodes to the current node). In a similar manner, the illustrative routing algorithm of the present invention as described herein will advantageously result in a packet taking a "most efficient" route (in terms of a combination of traffic and distance) through the network, since the packet is routed in the direction of local minimum potential among neighboring nodes (which is equivalent to local maximum "force"—i.e., potential difference—between the current node and the neighboring nodes thereto).

FIG. 1 shows a flowchart of an illustrative routing method in accordance with one illustrative embodiment of the present invention. In particular, the flowchart of FIG. 1 describes a first illustrative method which may be advantageously performed by a router in a packet-based network. The router is assumed to be located at network node i.

First, in flowchart block 11, the router receives a data packet to be routed to a specified destination. Then, for each neighboring network node j to network node i (block 12), in block 13, the router retrieves (if it doesn't already have) or determines the value of the traffic potential function for that neighboring node ($\Phi_j$). Decision box 14 determines whether all neighboring node potential values have been obtained or determined, and if so, block 15 computes both the traffic potential $\Phi_i$ and the total potential $V_i$ (with respect to the destination) for the router's own node.

Then, in block 16, the computed value of the router's own traffic potential ($\Phi_i$) is communicated to all neighboring nodes for their use in making their own (i.e., other) routing decisions. And finally, in block 17 the neighboring node having the minimum total potential value ($V_j$) is identified, and in block 18, the data packet is routed to its destination by way of that identified neighboring node.

Figure 2:
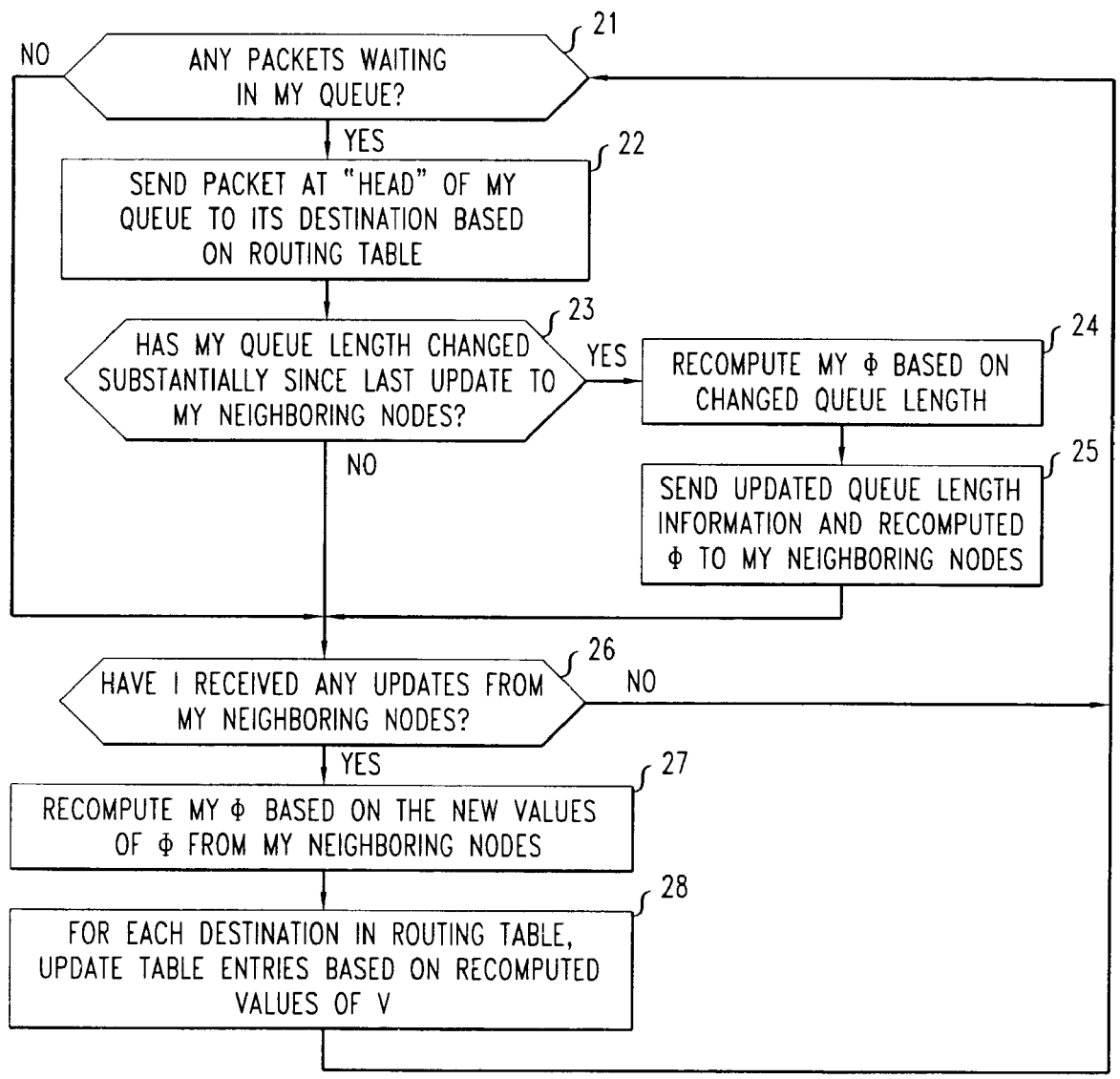
FIG. 2 shows a flowchart of an illustrative method for updating a routing table in accordance with another illustrative embodiment of the present invention.

FIG. 2 shows a flowchart of an illustrative method for updating a routing table in accordance with another illustrative embodiment of the present invention. In particular, the flowchart of FIG. 2 describes a second illustrative method which may be advantageously performed by a router in a packet-based network. The illustrative method shown in FIG. 2 assumes the presence of a queue of data packets waiting to be routed by the given router.

Specifically, the flowchart of FIG. 2 shows a continuous loop procedure which processes each such data packet in turn while maintaining a routing table which is updated in accordance with the principles of the present invention. Note that the loop comprises two, somewhat distinct, portions—one which updates the router's own queue length and/or potential information and, if necessary, sends the updated information to its neighboring nodes; and one which receives updated information from its neighboring nodes and updates the routing table to reflect such received updates.

Beginning with the first portion at the top of the flowchart, decision box 21 determines if there are any data packets waiting in the queue to be routed. If so, in block 22, the packet at the "head" of the queue (i.e., the packet which has been in the queue the longest) is sent to its destination based on the contents of the routing table. Then, decision box 23 determines whether the router's queue length has changed "substantially" (see discussion above) since the last updates were provided to the neighboring nodes to the router's node. If so, in block 24 the router's own traffic potential function ($\Phi$) is recomputed based on its current queue length (and the current values of its neighboring nodes' traffic potential function). Then, in block 25, the router sends updated queue length information and its recomputed traffic potential function value to its neighboring nodes.

In the second portion of the flowchart, decision box 26 determines whether any updates have been received from any of the neighboring nodes. If so, in block 27, the router's own traffic potential function ($\Phi$) is recomputed based on the new values for the neighboring nodes. And then, in block 28, the routing table is updated to reflect these new values with respect to each destination with an entry in the table. The overall illustrative process of the flowchart of FIG. 2 repeats indefinitely, with the router alternately processing the routing of a data packet (if there are any to be routed), and updating its routing tables (if necessary).

Figure 3:
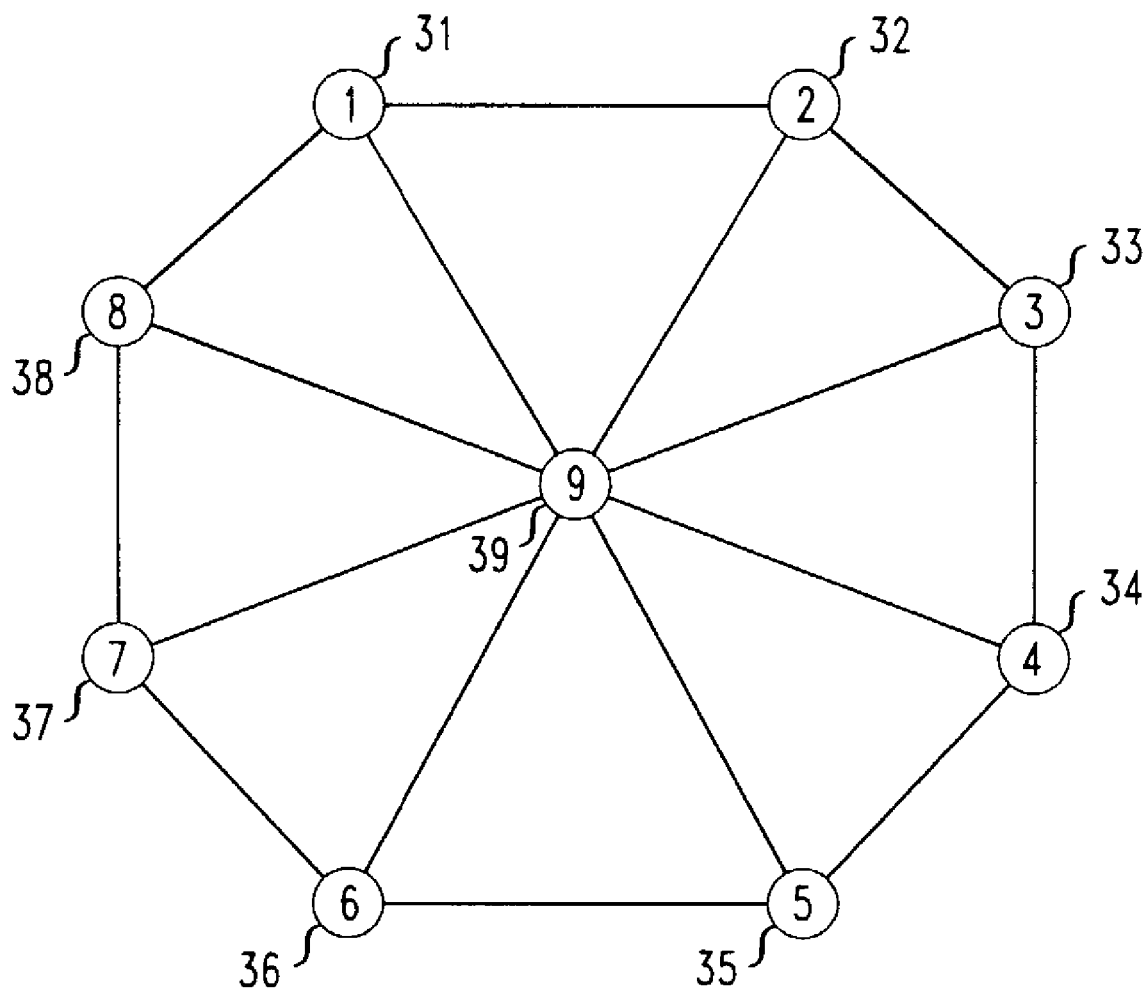
FIG. 3 shows an example of a packet-based network in which the illustrative routing method of FIG. 1 or the illustrative routing table updating method of FIG. 2 may be advantageously applied.

FIG. 3 shows an example of a packet-based network in which the illustrative routing method of FIG. 1 or the illustrative routing table updating method of FIG. 2 may be advantageously applied. Specifically, the network shown comprises 9 routers (router 31 through router 39) located at 9 nodes in the network graph (node 1 through node 9, respectively), arranged in a pattern which places router 39 (at node 9) in a central position. It is assumed that all links in the graph (i.e., all direct connections between neighboring routers) have equal metric "costs."

Now consider, for example, that when router 1 (at node 1) wants to send data packets to router 34 (at node 4), a minimum-cost distance routing algorithm would undoubtedly route that packet through router 9 (at node 9), which is clearly the minimum-cost route. However, if traffic congestion is high at node 9, which is likely to be the case due to its central location, a large packet queue may result at router 39. Thus, in accordance with an illustrative embodiment of the present invention, the potential function values associated with node 9 will increase substantially, thereby causing the total potential value at, for example, node 2 to become less than the total potential value at node 9. Then, as a result, router 31 will advantageously route packets to router 34 through router 32 (at node 2), rather than through router 39 (at node 9), at least until the traffic begins to build at node 2 (i.e., the packet queue of router 32 grows large), as well. In other words, in accordance with the illustrative embodiment of the present invention, packets will be advantageously routed along the perimeter of the illustrative network of FIG. 3, rather than through the centrally located, but highly congested, node 9, when it is more efficient to do so.

Addendum to the Detailed Description

It should be noted that all of the preceding discussion merely illustrates the general principles of the invention. It will be appreciated that those skilled in the art will be able to devise various other arrangements which, although not explicitly described or shown herein, embody the principles of the invention and are included within its spirit and scope.

For example, although the illustrative embodiments of the present invention as described herein make use of a "potential function" which has, for example, been analogized to a hypothetical electrostatic potential function representative of traffic conditions at various network routers (i.e., nodes) and/or network links, it will be obvious to those skilled in the art that various illustrative embodiments of the instant invention may make use of any similar such function which is representative of traffic conditions at those network routers and/or links, thereby providing some other measure of the "potential" for a given packet to find an efficient route through such networks routers and/or links. In particular, the term "potential function" as used herein and in the instant claims is hereby specifically intended to include any such function representative of traffic conditions.

Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

We claim:

1. A method for routing data packets in a network, the network comprising a first node, a plurality of neighboring network nodes to said first node, and, for each of said neighboring network nodes to said first node, one or more second-level neighboring nodes thereto, the method comprising the steps of:
   receiving a data packet at the first node of the network;
   determining a plurality of potential function values for a corresponding plurality of said neighboring network nodes to said first node, each of said potential function values having been calculated based at least on one or more measures of traffic conditions associated with said corresponding neighboring node; and
   routing said data packet based on said plurality of potential function values, wherein, for each one of said plurality of said neighboring network nodes to said first node, said corresponding potential function value determined therefor has been calculated further based on one or more potential function values which had been previously determined for a corresponding one or more of said second-level neighboring network nodes thereto, each of said one or more potential function values previously determined for said corresponding one or more of said second-level neighboring network nodes having been calculated based at least on one or more measures of traffic conditions associated with said corresponding second-level neighboring network node, and wherein said potential function value determined for each one of said neighboring network nodes to said first node has been calculated based on a mathematical function of said one or more potential function values for said one or more second-level neighboring network nodes thereto.

2. The method of claim 1 wherein said one or more measures of traffic conditions associated with said corresponding neighboring nodes comprise one or more packet queue lengths associated therewith.

3. The method of claim 2 wherein said data packet has a destination associated therewith, and wherein the step of routing said data packet is further based on a plurality of distance measures from said neighboring network nodes to said destination of said data packet.

4. The method of claim 2 wherein said one or more packet queue lengths associated with each of said corresponding neighboring nodes are associated with one or more network links connected to said corresponding neighboring node.

5. The method of claim 1 wherein said potential function value determined for each one of said neighboring network nodes to said first node has been calculated to be equal to a maximum of
   one or more packet queue lengths associated with said corresponding neighboring node to said first node, and
   said mathematical function of said one or more potential function values for said one or more second-level neighboring network nodes thereto.

6. The method of claim 1 wherein said step of routing said data packet comprises the step of transmitting said data packet to one of said neighboring network nodes to said first node based upon said one of said neighboring network nodes to said first node having a potential function value which is less than the potential function value of other ones of said plurality of said neighboring network nodes to said first node.

7. A method for generating a routing table for use by a first router in routing data packets in a packet-based network, the first router located at a first network node, the packet-based network comprising the first network node, a plurality of neighboring network nodes to said first network node, and, for each of said neighboring network nodes to said first network node, one or more second-level neighboring nodes thereto, the method comprising the steps of:
   receiving a plurality of potential function values from a corresponding plurality of said neighboring network nodes to said first network node, each of said potential function values having been calculated based at least on one or more measures of traffic conditions associated with said corresponding neighboring network node; and
   generating the routing table for said first router based on said plurality of potential function values, wherein, for each one of said plurality of said neighboring network nodes to said first node, said corresponding potential function value determined therefor has been calculated further based on one or more potential function values which had been previously determined for a corresponding one or more of said second-level neighboring network nodes thereto, each of said one or more potential function values previously determined for said corresponding one or more of said second-level neighboring network nodes having been calculated based at least on one or more measures of traffic conditions associated with said corresponding second-level neighboring network node, and wherein said potential function value received from each one of said neighboring network nodes to said first node have been calculated based on a mathematical function of said one or more potential function values for said one or more second-level neighboring network nodes thereto.

8. The method of claim 7 wherein said one or more measures of traffic conditions associated with said corresponding neighboring network nodes comprise one or more packet queue lengths associated therewith.

9. The method of claim 8 wherein each of said data packets has a destination associated therewith, and wherein the step of generating the routing table is further based on a plurality of distance measures from said neighboring network nodes to said destinations associated with said data packets.

10. The method of claim 8 wherein said one or more packet queue lengths associated with each of said corresponding neighboring nodes are associated with one or more network links connected to said corresponding neighboring node.

11. The method of claim 7 wherein said potential function value received from each one of said neighboring network nodes to said first node have been calculated to be equal to a maximum of
one or more packet queue lengths associated with said corresponding neighboring node to said first node, and
said mathematical function of said one or more potential function values for said one or more second-level neighboring network nodes thereto.

12. The method of claim 7 wherein said step of generating the routing table is based on determining which one of said neighboring network nodes to said first node has a potential function value which is less than the potential function value of other ones of said plurality of said neighboring network nodes to said first node.

13. A router for routing data packets in a network, the router located at a first node of the network, the network comprising the first node, a plurality of neighboring network nodes to said first node, and, for each of said neighboring network nodes to said first node, one or more second-level neighboring nodes thereto, the router comprising:
means for receiving a data packet;
means for receiving a plurality of potential function values for a corresponding plurality of said neighboring network nodes to said first node, each of said potential function values having been calculated based at least on one or more measures of traffic conditions associated with said corresponding neighboring node; and
means for routing said data packet based on said plurality of potential function values, wherein, for each one of said plurality of said neighboring network nodes to said first node, said corresponding potential function value determined therefor has been calculated further based on one or more potential function values which had been previously determined for a corresponding one or more of said second-level neighboring network nodes thereto, each of said one or more potential function values previously determined for said corresponding one or more of said second-level neighboring network nodes having been calculated based at least on one or more measures of traffic conditions associated with said corresponding second-level neighboring network node, and wherein said potential function value received from each one of said neighboring network nodes to said first node has been calculated based on a mathematical function of said one or more potential function values for said one or more second-level neighboring network nodes thereto.

14. The router of claim 13 wherein said one or more measures of traffic conditions associated with said corresponding neighboring network nodes comprise one or more packet queue lengths associated therewith.

15. The router of claim 14 wherein said data packet has a destination associated therewith, and wherein the means for routing said data packet is further based on a plurality of distance measures from said neighboring network nodes to said destination of said data packet.

16. The router of claim 14 wherein said one or more packet queue lengths associated with each of said corresponding neighboring nodes are associated with one or more network links connected to said corresponding neighboring node.

17. The router of claim 13 wherein said potential function value received from each one of said neighboring network nodes to said first node has been calculated to be equal to a maximum of
one or more packet queue lengths associated with said corresponding neighboring node to said first node, and
said mathematical function of said one or more potential function values for said one or more second-level neighboring network nodes thereto.

18. The router of claim 13 wherein said means for routing said data packet comprises means for transmitting said data packet to one of said neighboring network nodes to said first node based upon said one of said neighboring network nodes to said first node having a potential function value which is less than the potential function value of other ones of said plurality of said neighboring network nodes to said first node.

* * * * *